United States Patent [19]

Carcedo et al.

[11] Patent Number: 5,673,531
[45] Date of Patent: Oct. 7, 1997

[54] REMOVABLE AND VERSATILE MODULAR METAL STRUCTURE

[76] Inventors: Jose Muñoz Carcedo; Jose Manuel Perez Cidre, both of Pol. Ind. El Lomo, Nave 50, Humanes De Madrid, Madrid, Spain

[21] Appl. No.: 555,696

[22] Filed: Nov. 14, 1995

[30] Foreign Application Priority Data

Nov. 21, 1994 [ES] Spain .................................. 9402372

[51] Int. Cl.$^6$ ............................................. F16B 7/04
[52] U.S. Cl. ............... 52/656.9; 52/646; 52/653.2; 52/655.1; 52/775; 52/736.2; 52/731.5; 403/170; 403/297; 403/348; 403/231; 403/255; 403/257; 403/252
[58] Field of Search ............... 52/656.9, 646, 52/653.2, 655.1, 761, 781, 731.5, 732.1, 732.2, 736.2, 766, 767, 768, 769, 775; 403/297, 292, 170, 119, 348, 350, 231, 403, 205, 382, 362, 252, 254, 255, 256, 257, 240, 264

[56] References Cited

U.S. PATENT DOCUMENTS

| | | | |
|---|---|---|---|
| 2,859,710 | 11/1958 | Elsner | 248/297.21 X |
| 3,966,342 | 6/1976 | Moriya | 403/297 X |
| 4,076,432 | 2/1978 | Glaser | 403/176 |
| 4,270,872 | 6/1981 | Kiyosawa | 403/170 |
| 4,485,597 | 12/1984 | Worrallo | 403/297 X |
| 4,549,832 | 10/1985 | Sterl | 403/297 X |
| 4,556,337 | 12/1985 | Marshall | 403/297 |
| 4,750,310 | 6/1988 | Holcombe | 403/348 X |
| 4,770,560 | 9/1988 | Ott | 403/350 X |
| 4,775,259 | 10/1988 | Shell | 403/348 X |
| 4,907,388 | 3/1990 | Siahatgar | 406/252 X |
| 4,928,470 | 5/1990 | Perez | 52/656.9 |
| 5,011,323 | 4/1991 | Liuo | 403/403 X |
| 5,155,960 | 10/1992 | Shaanan | 403/202 X |
| 5,169,258 | 12/1992 | Raynak | 403/170 |
| 5,277,512 | 1/1994 | Dwillies | 403/348 |
| 5,516,225 | 5/1996 | Kvols | 403/231 X |

FOREIGN PATENT DOCUMENTS

| | | | |
|---|---|---|---|
| 423474 | 4/1991 | European Pat. Off. | 403/403 |
| 2356033 | 2/1978 | France | 403/231 |
| 2502267 | 9/1982 | France | 403/119 |
| 2519388 | 7/1983 | France | 403/382 |
| 2528921 | 12/1983 | France | 403/297 |
| 2059829 | 5/1972 | Germany | 403/297 |
| 2509768 | 9/1976 | Germany | 403/231 |
| 3131537 | 3/1983 | Germany | 403/382 |

*Primary Examiner*—Carl D. Friedman
*Assistant Examiner*—Laura A. Saladino
*Attorney, Agent, or Firm*—Fish & Richardson P.C.

[57] ABSTRACT

A modular, removable and versatile metal construction includes each of the following: support, transverse and perpendicular profile elements, connection devices, rigid connection pieces, and rigid connection elements. The support profile element has a core with a central opening, and lateral wings having a pair of projections defining an opening therebetween with two channels. The perpendicular profile element is positioned perpendicular to the support and transverse profile elements. The connection device includes a clamp having first and second parts terminating at different levels at an end region of the device, the parts together defining, in sequence, an end, first opposite projections, first opposite indentations, second opposite projections, and second opposite indentations, the end, indentations and projections providing securing engagement at five contact points within a lateral opening. The rigid connection piece joins support and transverse profile elements and includes a rod, and fitting and fastening washers at an end region of the rod and sized and shaped for securing engagement with channels of a support profile element. The angular rigid connection element joins an assembly of support, transverse and/or perpendicular profile elements.

11 Claims, 5 Drawing Sheets

5,673,531

REMOVABLE AND VERSATILE MODULAR METAL STRUCTURE

DESCRIPTION

OBJECT OF THE INVENTION

The invention refers to a metal structure, of the modular configuration type, made through the combination of a minimal series of assembly and connecting elements to determine a large range of building shapes and elements.

The fundamental application of this construction is the assembly of trade fair type stands and accessories to stands. Other applications include some of the fixed type such as walls, partitions, etc.

The structure of the invention is made up of profiles set in multiple combinations with anchor elements that determine connections between complete shelf stands and partitions, among themselves and together with other construction elements such as ceilings, display cases, open display elements, etc. with a large variety of combinations of connection devices, some of them rigid and others articulated and of variable angular setting.

BACKGROUND OF THE INVENTION

The wide diffusion of aluminum based profile elements, for use in a wide number of new activities, as well as in other activities traditionally reserved to conventional ironwork has generated an extremely diverse multiplicity of profiles and parts used to connect such profile elements together.

In fields such as fixed or sliding partitions, rotating, sliding or articulated doors, as well as in large continuous enclosures, the progress achieved in the construction of these new profiles has been outstanding.

Notwithstanding the foregoing, there are fixed structure applications that are constructed so that they may be taken apart for later successive extensions, in the same way that there are others that are taken apart again after brief periods of use, such as stands at trade fairs and exhibitions. Both types require connection devices and assembly and disassembly means that must necessarily be of the fast operation type, in order to make these products competitive, which requires the existence of profiles and connection parts specially prepared for these purposes, i.e. profiles and parts not normally found in the market.

The existence of rigid joining parts may be similarly observed in the construction of conventional metal work, which lack the clearances required to compensate for structural adjustments normally required in metal work.

DESCRIPTION OF THE INVENTION

The solution herein advanced consists of a combination of various types of metal work profiles with a number of assembly parts, resulting in complex and varied connections and devices.

The variable angle and articulation connection devices consist of a set of profile transverse connection elements featuring a double part, shaped like a clamp, articulated at one end by an internal semi-cylindrical projection that fits into a similarly shaped recess defined in the other half of the clamp shaped part.

The first end of the parts have different lengths arranged so that the clamp tightens up as a slanted joint by closing the shortest part, fitted with the semi-cylindrical projection, upon the other part.

This first end region has two projections and two slots or indentations that fit into corresponding channels defined by internal elements of the projections on the wing of a supporting profile.

The clamp is introduced, already assembled, into a housing duly arranged for the purpose of embedding the clamp, made of a transverse profile element to which the clamp is then joined.

One of the parts has, centrally located and near a clamp lip contact area, a threaded hole for the passage of an Allen bolt which, at the same time, passes through one of the clamp profile surfaces, the hole coinciding with an internal transverse rectangular rib on one of the parts, which is identical to another on the opposite part, upon which frontal surface rests the Allen bolt. This bolt presses against and, because of the progressive pressure, opens the clamp through articulation until it fits rigidly inside the housing profile, thus lending rigidity to the joint between the two transverse profiles.

The clamp may be cut slant wise from two of its opposite diagonal vertices of one of its larger surfaces, the cut allowing the clamp to fit into a profile also cut slant wise, thus configuring it to a tie, a railing post, a slanted panel, etc.

The rigid connection devices are made from an octagonal section profile of which vertices come out externally and radially, with two fins forming a double consecutive arrow tip that determines between each two profiles, two channels into which, e.g. irregularly shaped washers with fitting circular sector cuts and other full external washers for tightening are introduced, or, alternatively, the external washers may be substituted by a tubular part, of external octagonal shape, that operates as a guide and as a support to a traverse connection profile.

A profile with a square core section and with extensions on two, three or four sides, fitted with projections and re-sunk, may also be arranged, with a function identical to those described with respect to the foregoing octagonal core profile and with the same purpose.

The surfaces that do not have projections enabling connection between profiles are arranged with a convex curved finish.

The fundamental profiles to be combined with each other and through the use of assembly parts have an angular connection, e.g. at 45°, 90° or 135° angles, within a same plane, using central projections of the profile frame, which constitute the profile core to make up beams, pillars, transoms, footings, shoring, etc.

To these frames may also be attached, orthogonal to the plane of the angular profile, one or two profiles that assemble onto frame transverse projections, which are fitted with different external shapes, polygonal or curved side polygonal. Internally, these profiles may have an octagonal or square core.

DRAWING DESCRIPTION

In order to complement the description and to aid a better and easier understanding of the characteristics of the invention, this patent specification includes, as an integral part thereof, a set of drawings where the following has been duly represented for purely illustrative but not limitative purposes:

FIG. 2 is a plan view and an exploded view, partially in section, of the articulation and variable angle connection device of the invention; while FIG. 2A is a perspective view of an assembly of the invention, in its orthogonal and slanted executions.

FIG. 4 is a perspective view of rigid connection devices of the invention used to configure a square core structure while

PREFERRED EMBODIMENT OF THE INVENTION

Figure 1:
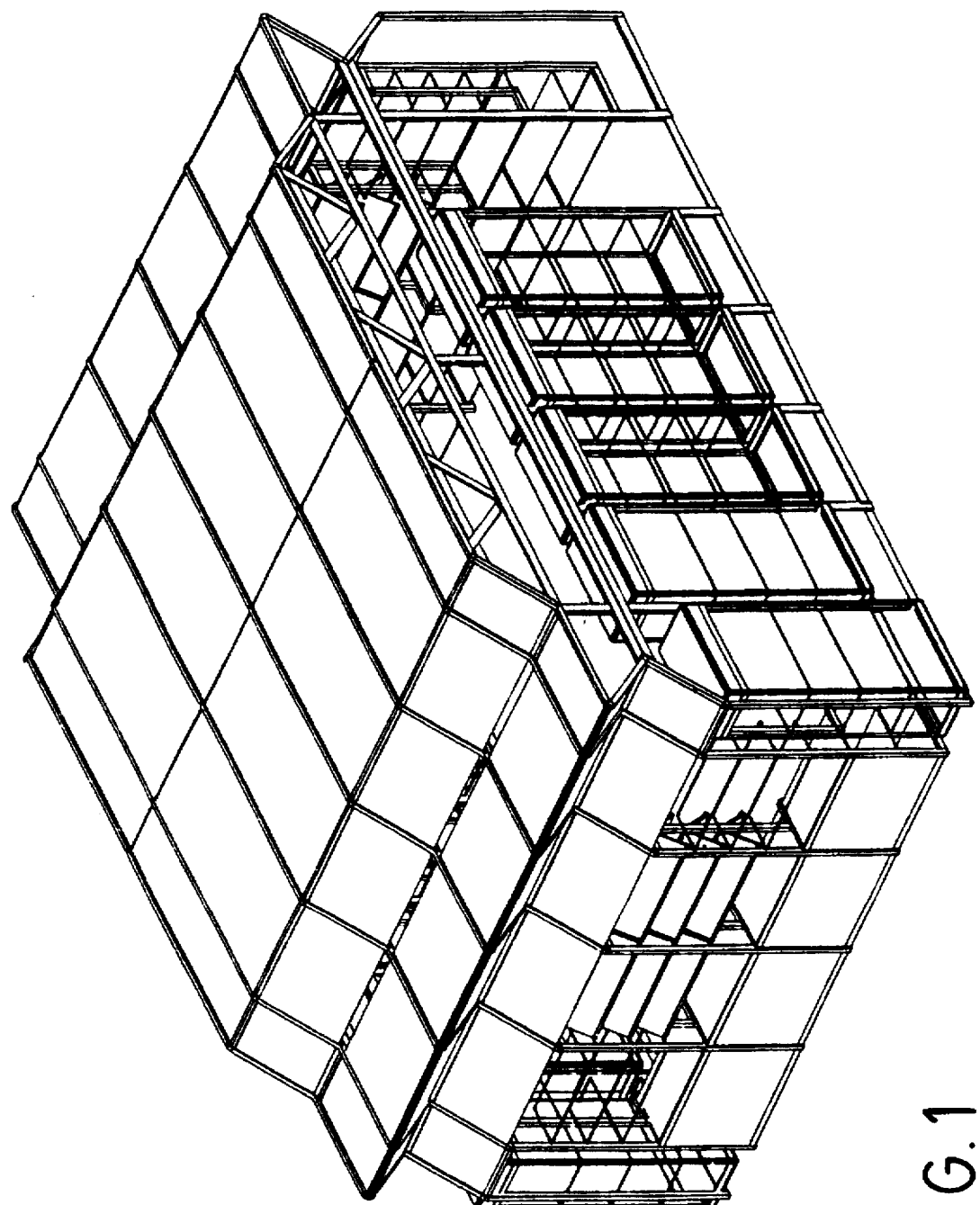
FIG. 1 is a perspective view of a kiosk, e.g. designed to sell newspapers and for other services, incorporating arrangements of connection devices through articulation and of variable angle, of rigid connection and assembly profiles of the invention.
Figure 2:
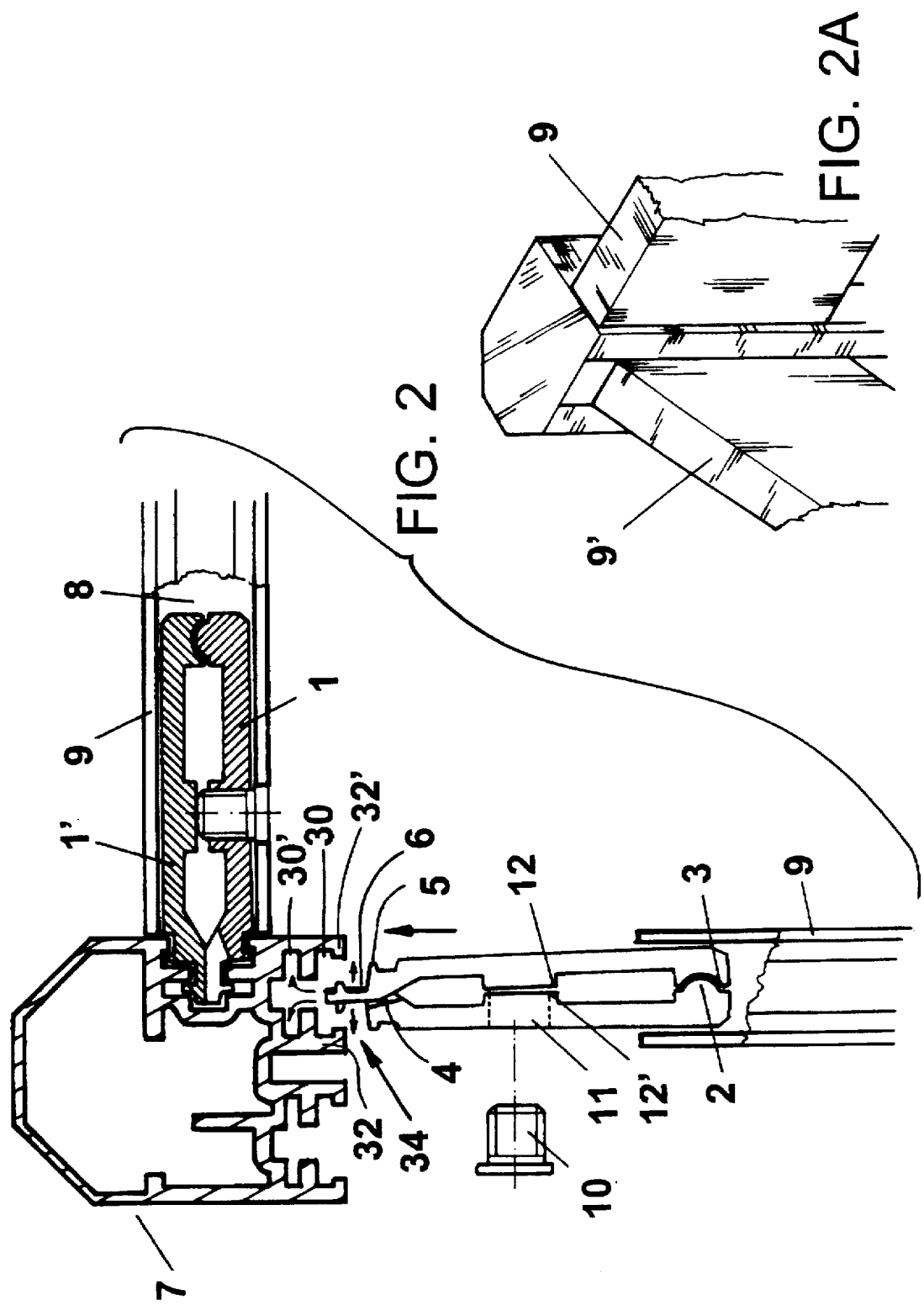
Figure 3:
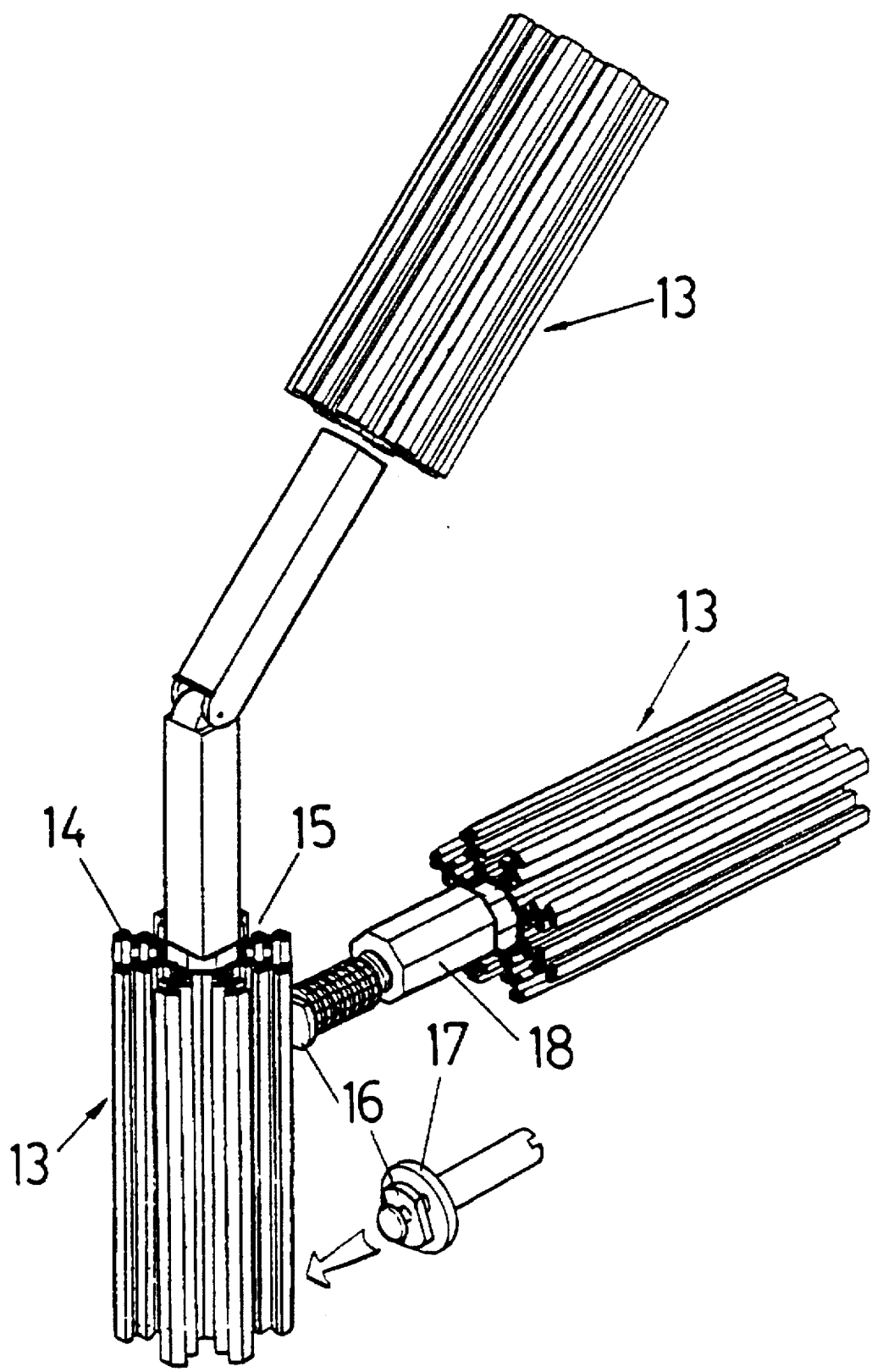
FIG. 3 is a perspective view of some rigid connection devices of the invention used to configure an octagonal core structure.
Figure 4A:
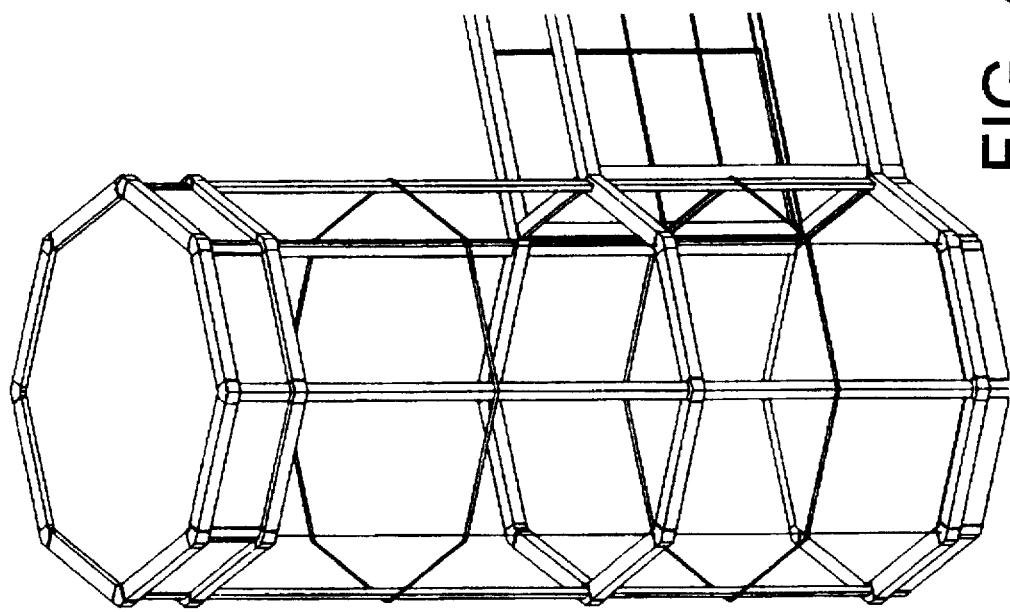
FIG. 4A is a perspective view of the application of the rigid connection device of FIG. 4 in an octagonal display case.
Figure 4:
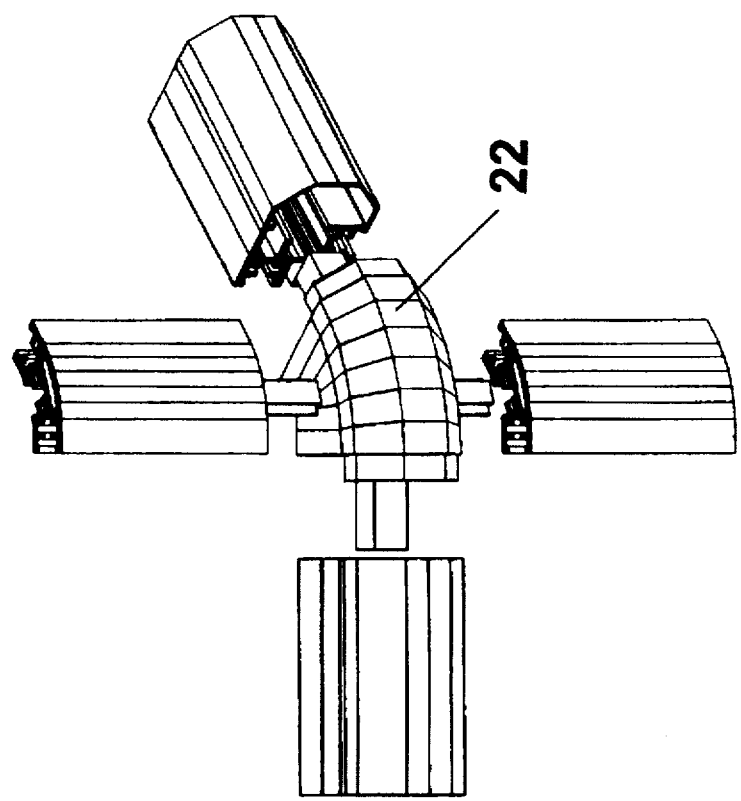

Referring to the figures, the invention consists of a combination of metalwork profiles with other assembly parts, resulting in a wide variety of connection devices, through articulation and with variable angles, as well as to effect rigid connections.

The devices used for connection through articulation and with variable angles for transverse profile connection have a clamp consists of a first part (1) and a second part (1'), articulated at one of its ends by a semi-cylindrical projection (2) of the first part (1) that fits into a recess (3) defined by the second part (2). At the opposite end, the parts are of different lengths; are arranged on slanted contact (4) with two projections (5, 5') and two openings (6, 6') that fit into similarly shaped channels (30, 30') defined by the projections (32, 32') the wing (34) of a supporting profile (7) to which they are fastened. The rest of the clamp is then introduced into the boxlike structure (8) of a transverse profile (9) to which the clamp is then fastened through the action of a bolt (10) passing through a hole (11) and a rib (12) in part (1), thereby to exert pressure against an opposed rib (12') on the opposite part (1'), thereby giving rigidity to the joint between profiles (7) and (9).

The clamp may be cut slant wise, to fit into a similarly slant wise cut profile (9'), e.g. configuring a tie, a railing, a slanted panel, etc., without losing the capacity to adapt, through use of variable angles, to the general requirements of the structure.

The rigid connection devices have an octagonal profile (13) and are fitted with radial fins (14) that define channels (15) into which may be introduced, e.g., fitting washers (16) together with fastening washers (17), or fitting said washers (16) and an octagonal part (18) that works as a guide and supports of a conventional carrying profile.

Figure 5A:
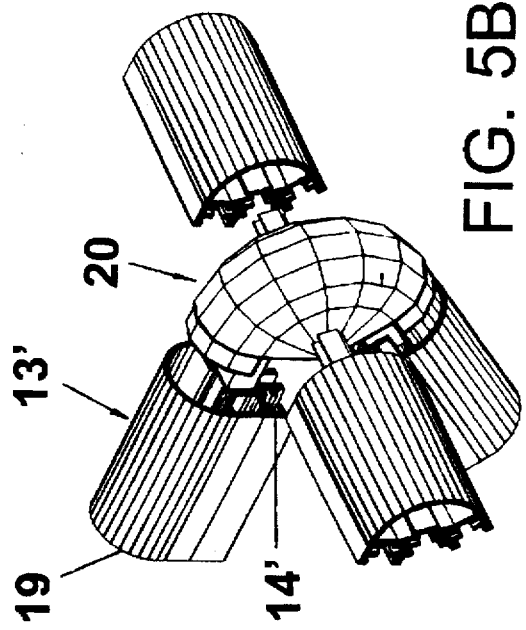
FIGS. 5, 5A and 5B show perspective views of randomly chosen examples of joints of parts of the invention determining the structure, and ready to receive the panel holding profiles, display cases, etc., at 45° and 90° angled finishes.
Figure 5:
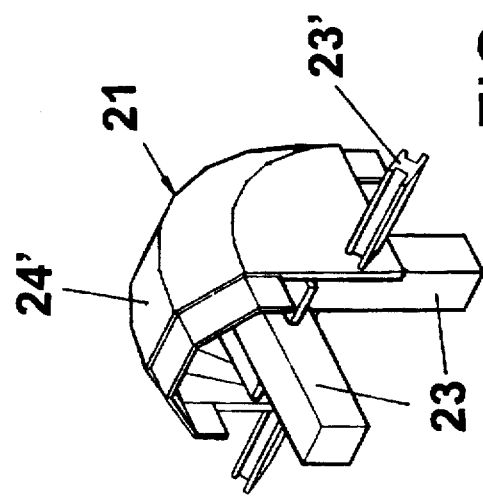
Figure 5B:
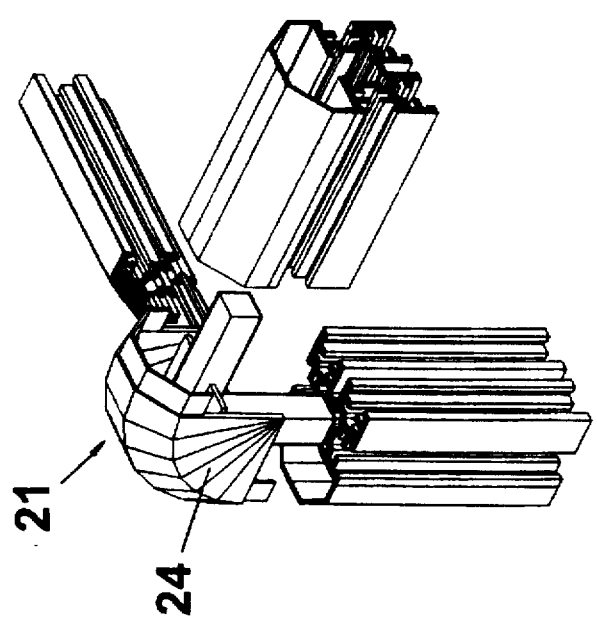

Referring to FIGS. 5, 5A and 5B, a square profile (13') has fins (14') projecting out of two, three or its four surfaces, with a function identical to that of the fins (14). The surfaces (19) not fitted with fins (14') feature a convex curved finish.

The profiles are assembled using rigid angular connections at angles of 45° (20), 90° (21) and 135° (22), within a single plane, using articulated axes (23) capable of being screwed onto the frame (24). These then constitute the core of the profile, acting as a beam, pillar, transom, footing, shoring, etc. The frames (24') are thus capable of being assembled into as many profiles as desired, using the remaining transverse axis (23') of the frame, and may be configured either just polygonally or polygonally with a curved side, the profiles internally having a octagonal or square core, as a function of the extension of the part.

It is not considered necessary to extend this description any further to enable any expert in the art to understand the scope of the invention and the advantages derived therefrom, as well as to enable its reproduction.

It is well understood that, as long as the essential features of the invention are not altered, both the materials and the shape, size and arrangement of the elements may be varied within the same characterization.

The terms used to describe the invention should be interpreted in a wide and non-limitating sense.

We claim:

1. A modular, removable and versatile metal construction comprising:

at least one support profile element comprising a core defining a central opening, and two or more lateral wings, each said lateral wing comprising a pair of lateral wing projections defining a lateral opening therebetween, said lateral opening including two axially-spaced channels, at least one transverse profile element defining a central core, at least one perpendicular profile element adapted to be positioned perpendicular to said support profile element and to said transverse profile element, at least one variable angle and articulation connection device for joining together a said support profile element with a said perpendicular profile element, said connection device comprising a clamp having a first part and a second part, each terminating at different levels in a first end region of said connection device, and, in said first end region of said connection device, said first part and said second part together defining, in sequence, a first end, first opposite lateral part projections, first opposite lateral part indentations, second opposite lateral part projections, and second opposite lateral part indentations, the first end and the indentations and projections in the first end region of said connection device being sized and shaped for securing engagement at five contact points within a said lateral opening of a said support profile element, at least one rigid connection piece adapted to join together a said support profile element and a said transverse profile element, said connection piece comprising a rod adapted to extend within a core defined by a said transverse profile element, and fitting washers and fastening washers associated with an end region of said rod, said fitting washers and said fastening washers being sized and shaped for securing engagement with said two axially-spaced channels of a said support profile element, and at least one angular rigid connection element for joining together an assembly of one or more said support profile elements, one or more said transverse profile elements one or more said perpendicular profile elements, or a combination thereof.

2. The modular, removable and versatile metal construction according to claim 1, wherein, at a second, opposite end region of said clamp, one of said first part and said second part of said clamp defines a recess, and another of said first part and said second part of said clamp comprises a projection sized and constructed for engagement and articulation within said recess.

3. The modular, removable and versatile metal construction according to claim 1, wherein said clamp, at said first end, has a first dimension adapted to be measured in a direction along said channels, and, at a second, opposite end has a second dimension adapted to be measured in a direction along said channels, said first dimension being different from said second dimension, said clamp being sized and shaped for engagement within a said perpendicular profile element having a slantwise cut.

4. The modular, removable and versatile metal construction according to claim 3, wherein said perpendicular profile element having a slantwise cut has the form of a tie, a railing, or a slanted panel.

5. The modular, removable and versatile metal construction according to claim 1, wherein said angular rigid connection element is configured with a frame having one or more arms extending from a central articulated axis, each said arm being positioned for introduction into a core of a said support profile element or a core of a said transverse profile element.

6. The modular, removable and versatile metal construction according to claim 5, wherein said frame is polygonal.

7. The modular, removable and versatile metal construction according to claim 5, wherein said frame defines a curved side surface.

8. The modular, removable and versatile metal construction according to claim 7, wherein said curved side surface defines an angle of 45°.

9. The modular, removable and versatile metal construction according to claim 7, wherein said curved side surface defines an angle of 90°.

10. The modular, removable and versatile metal construction according to claim 7, wherein said curved side surface defines an angle of 135°.

11. The modular, removable and versatile metal construction according to claim 1, wherein said rigid angular connection piece comprises at least one arm adapted to be aligned with a corresponding transverse axis extending from a lateral surface of said frame for introduction into a core of a said perpendicular profile element.

* * * * *

UNITED STATES PATENT AND TRADEMARK OFFICE
CERTIFICATE OF CORRECTION

PATENT NO. : 5,673,531

DATED : October 7, 1997

INVENTOR(S) : Jose Munoz Carcedo and Jose Manuel Perez Cidre

It is certified that error appears in the above-identified patent and that said Letters Patent is hereby corrected as shown below:

Column 2, line 39, after "connection" add --e.g.--.

Column 2, line 42, change "and" to --or--.

Column 3, line 31, change ";" to --and--.

Column 4, line 2, change "any" to --an--.

Signed and Sealed this

Twenty-sixth Day of January, 1999

Attest:

Attesting Officer

Acting Commissioner of Patents and Trademarks